United States Patent [19]

Belloc et al.

[11] 3,875,006

[45] Apr. 1, 1975

[54] PROTEOLYTIC ENZYME FROM STREPTOMYCES HYGROSCOPICUS

[75] Inventors: André Belloc, Vanves; Jean Florent, Paris; Denise Mancy, Charenton; Jean Verrier, Boulogne sur Seine, all of France

[73] Assignee: Rhone-Poulenc S.A., Paris, France

[22] Filed: Aug. 10, 1972

[21] Appl. No.: 279,299

[30] Foreign Application Priority Data
Aug. 12, 1971 France .............................. 71.29581

[52] U.S. Cl. ................... 195/62, 195/63, 195/66 R, 426/20, 426/152
[51] Int. Cl. ...................... C07g 7/028, A21d 13/00
[58] Field of Search ............. 195/62, 66, 63; 99/91; 426/19, 20

[56] References Cited
UNITED STATES PATENTS
3,127,327 3/1964 Nomoto et al. .................. 195/66 R

| 3,331,751 | 7/1967 | Reusser............................... 195/62 |
| 3,573,170 | 3/1971 | Clark et al........................... 195/63 |
| 3,578,462 | 5/1971 | Smerak et al...................... 99/91 X |
| 3,684,658 | 8/1972 | De Lin et al......................... 195/62 |

FOREIGN PATENTS OR APPLICATIONS
7,646  2/1970  France

OTHER PUBLICATIONS
Breed, et al., Bergey's Manual of Determinative Bacteriology, 7th ed., The Williams & Wilkins Co., Baltimore, 1957 (pp. 796–797) QR81.56 C.5.

*Primary Examiner*—David M. Naff
*Attorney, Agent, or Firm*—Stevens, Davis, Miller & Mosher

[57] ABSTRACT

A proteolytic enzyme useful in the manufacture of baked goods made with flour is prepared by the culture of the microorganism Streptomyces hygroscopicus DS 14649 (NRRL 3999).

7 Claims, No Drawings

PROTEOLYTIC ENZYME FROM STREPTOMYCES HYGROSCOPICUS

The present invention relates to proteolytic enzymes and their preparation.

The invention provides the new enzyme herein called 25,462 RP which can be obtained by culture, in artificial media, of *Streptomyces hygroscopicus* DS 14,649 (NRRL 3,999).

25,462 RP is a protein which is isolated as a grey amorphous powder. It is very soluble in water, sparingly soluble in concentrated solutions of neutral salts (for example, ammonium sulphate) and in aqueous-alcoholic of aqueous-acetone mixtures and insoluble in anhydrous alcohols and ketones. The proteolytic activity of the enzyme 25,462 RP is shown on a large number of protein substrates, e.g. casein, haemoglobin, fibrin (lysis of clots), and milk (coagulation).

The activity on casein is determined by a technique suggested by that developed by KUNITZ for the determination of trypsin [KUNITZ, J. Gen. Physiol, 30, 291 (1947)]. The peptides soluble in trichloroacetic acid, which are set free during the hydrolysis, are determined by spectrophotometry (optical density at 280 nm) and are expressed in terms of equivalents of tyrosine. The enzymatic activity is expressed in KUNITZ units (K.U.), 1 unit being the amount of enzyme which sets free in one minute sufficient soluble peptides for the optical density at 280 nm of the trichloroacetic acid filtrate to increase by 1.0.

Tables I and II below give the results obtained for the hydrolysis of casein by the enzyme 25,462 RP at different pHs and at different temperatures. For each experiment, 22 µg of enzyme, of strength 2,250 K.U./g., that is to say 0.05 K.U., were used.

TABLE I

Hydrolysis of casein at 30°C by 25,462 RP - influence of pH

| pH of the reaction medium | Nature of the buffer | peptides set free in 20 minutes (mg tyrosine equivalents) |
|---|---|---|
| 5.5 | phosphate 0.1M | 0.230 |
| 6.0 | do. | 0.288 |
| 6.5 | do. | 0.435 |
| 6.8 | do. | 0.455 |
| 7.0 | do. | 0.365 |
| 7.5 | do. | 0.148 |
| 8.0 | borate 0.2 M | 0.100 |
| 8.5 | do. | 0.085 |
| 9.0 | do. | 0.060 |
| 9.5 | do. | 0.060 |

TABLE II

Hydrolysis of casein at pH = 6.8 by 25,462 RP influence of the temperature

| Temperature °C | Peptides set free in 20 minutes (mg tyrosine equivalents) |
|---|---|
| 25 | 0.460 |
| 30 | 0.455 |
| 35 | 0.400 |
| 40 | 0.135 |
| 45 | 0.060 |
| 50 | 0.055 |
| 55 | 0.050 |
| 60 | 0.005 |

The enzyme 25,462 RP is thus active in a rather narrow range of pH. The optimum pH is 6.8 and the enzyme retains an activity which is greater than 50% of its maximum activity in the range 5.5 – 7.0. At pH = 6.8, the optimum temperature is between 25°C and 30°C; at 40°C, the enzyme shows only about 30% of its maximum activity.

The kinetics of formation of peptides from casein by the enzyme 25,462 RP and by trypsin are given in Table III below. It is found that the enzyme 25,462 RP does not hydrolyse more bonds than trypsin in this substrate.

TABLE III

Comparative hydrolysis of casein at pH = 7.0 and at 37°C by the enzyme 25,462 RP and by trypsin

| Reaction time (minutes) | Peptides set free (mg tyrosine equivalents) by | |
|---|---|---|
| | the enzyme 25,462 RP* | trypsin** |
| 1 | 0.078 | 0.050 |
| 3 | 0.191 | 0.130 |
| 5 | 0.270 | 0.224 |
| 10 | 0.430 | 0.312 |
| 15 | 0.485 | 0.400 |
| 20 | 0.560 | 0.500 |
| 40 | 0.705 | 0.635 |
| 60 | 0.780 | 0.770 |

*47 µg of enzyme 25,462 RP, of strength 2,250 K.U./g.(0.103 K.U.)
**23 µg of crystalline trypsin, of strength 4,500 K.U./g. (0.103 K.U.)

The new enzyme can be used advantageously in the foodstuffs industry, and in particular as an adjuvant in bread-making: when added to flour in amount of 5 to 10 mg./kg., the enzyme makes it easier to work the dough, very substantially decreases the time necessary for fermentation and improves the quality of the bread produced (by ensuring, in particular, a more uniform distribution of air cells in the soft part of the bread). It can be used in bread-making, biscuit-making and rusk-making.

For these uses, the enzyme is advantageously employed in compositions in which it is combined with compatible diluents which make it easier to measure and incorporate. For example, in the foodstuffs industry, the enzyme 25,462 RP can be diluted with pulverulent products, especially those based on carbohydrates or inorganic salts, such as wheat flour, starch, sucrose, glucose, lactose and calcium carbonate, either alone or combined with other ingredients which are used in small amounts (e.g. flavouring agents and permitted edible dyestuffs). In these compositions, the enzyme can represent from 0.005 to 99% by weight, but preferably from 1 to 10%. If desired, the enzyme particles can be isolated by a coating which is labile under the use conditions and which is, for example, soluble in water.

The organism which produces 25,462 RP belongs to the Streptomyces genus; it is called *Streptomyces hydroscopicus* DS 14,649 (NRRL 3,999). This organism was isolated from a sample of earth taken in Brittany (France). It has been deposited at the Northern Regional Research Laboratory, Peoria, Ill. (U.S.A.) under the number NRRL 3,999, from where it can be freely obtained.

The method of isolation is as follows. The sample of earth is suspended in sterile distilled water and the suspension is then diluted to different concentrations; a small volume of each dilution is spread on the surface of Petri dishes containing a nutrient agar medium. After incubation for several days at 26°C, the colonies of micro-organisms which it is desired to isolate are transplanted on agar slopes for the purpose of producing abundant cultures.

The strain Streptomyces hygroscopicus DS 14,649 belongs to the species *Streptomyces hygroscopicus*, the essential characteristics of which have been defined by H. D. TRESNER and E. J. BACKUS (Applied Microbiology, 4, 243–250, 1956) and by S. A. WAKSMAN (The Actinomycetes, II, the Williams and Wilkins Company, Baltimore, 1961, p. 230–231).

*S. Hygroscopicus* DS 14,649 possesses, in effect, the three following properties, which correspond to the three characteristics by which H. D. TRESNER and E. J. BACKUS, as well as S. A. WAKSMAN, define the species *S. hygroscopicus*:

a. Its sporophores generally end in tight spirals possessing a coil of a few turns: these spiral sporophores are usually inserted along a principal filament, forming clusters which may be more or less elongated.

b. When its sporulated aerial mycelium has reached a good state of development, it shows a dark grey colouration corresponding to that shown by the species *S. hygroscopicus*.

c. On certain culture media which allow the aerial mycelium to develop well, the appearance, on ageing, in the sporulated surfaces, of shiny black regions with a wet appearance, characteristic of the species S. hygroscopicus. In the case of S. hygroscopicus DS 14,649, the formation of characteristic black regions only takes place to a somewhat limited extent, confined rather to small points or to small regions distributed in places in the aerial mycelium, rather than taking place over its entire surface. It is, however, evident and can be observed in particular on Hickey and Tresner agar, Bennett agar, Pridham yeast extract agar, Pridham oat and tomato agar, and Pridham starch/inorganic salts agar.

H. D. TRESNER and E. J. BACKUS state that a wine-coloured soluble pigment is produced by a certain number of strains of the species *S. hygroscopicus* on certain media which vary depending on the particular cases. *S. hygroscopicus* DS 14,649 also possesses this property. However, although it can elaborate a wine-coloured soluble pigment, it only shows this property to a limited extent, since, among all the media, for which the description of its morphological properties is given hereafter, the formation of a wine-coloured soluble pigment is only observed on Hickey and Tresner agar and on Czapek synthetic agar containing glycerine, where it is especially visible at the start of the cultures and is produced in a rather small amount.

The strain *S. hygroscopicus*, as described by S. A. WAKSMAN in "The Actinomycetes", shows, on the few culture media where its morphological appearance is described, a few small differences from the strain DS 14,649, the most noteworthy of which are that the former (i) liquefies gelatine slowly, (ii) forms a well developed aerial mycelium on glucose/asparagine agar, which, after sporulation, takes on a blackish, shiny appearance, characteristic of the species *S. hygroscopicus*, and (iii) gives a well developed culture on nitrate agar containing sucrose, whilst the latter, i.e. strain DS 14,649, (i) liquefies gelatine rapidly, (ii) forms practically no aerial mycelium on glucose/asparagine agar or an aerial mycelium which is reduced to a few whitish traces, and (iii) does not develop on nitrate agar containing sucrose because it does not use sucrose. However, these few differences are too insignificant to allow the strain DS 14,649 to be considered as a different species from *S. hygroscopicus* of which, in other respects, it possesses the principal characteristics which serve to define it.

*S. hygroscopicus* DS 14,649 forms sporiferous filaments which, in general, end in tight spirals possessing 2 to 5 turns, although occasionally it is possible to observe spirals which form a larger number of turns, or also some sporiferous filaments which are simply curved over at their end part without forming a complete turn, or spirals which are more or less loose and unwound. The sporiferous apparatus possesses a cluster structure, the spiral sporophores, which are themselves capable of possessing a few branches, being inserted along a principal filament which can be quite long. The spores are oval and measure 0.4 to 0.6 $\mu$ by 0.8 to 1.0 $\mu$. Microscopic examinations reveal an identical arrangement of the sporiferous apparatus on Hickey and Tresner agar and on Pridham starch/inorganic salts agar. By its method of sporulation, *S. hygroscopicus* DS 14,649 is located in the *Spira* section of the Pridham classification.

*S. hygroscopicus* DS 14,649 develops well at 26°C, a little less well at 37°C and not at all at 50°C. Its cultural characteristics and its biochemical properties are given in the Table which follows; unless otherwise stated, they are those of cultures which have reached a good stage of development, aged about 3 weeks at 26°C. These characteristics were observed on nutrient agars and broths usually employed to determine the morphological characteristics of Streptomyces strains, the cultures on agar media being carried out on agar slopes. A number of the culture media used were prepared in accordance with the formulations given in "The Actinomycetes" (S. A. WAKSMAN, p. 193–197, Chronica Botanica Company, Waltham, Mass., U.S.A., 1950); in this case, they are indicated by the letter W followed by the number which was given them in "The Actinomycetes". The references or constitutions of the other culture media are as follows:

Ref A. "Hickey and Tresner's Agar" — T. G. PRIDHAM and colleagues — Antibiotics Annual, 1956–1957, p. 950.

Ref. B. K. L. JONES — Journal of Bacteriology, 57, 142, 1949

Ref C. Formulation W-23, to which 2% agar has been added

Ref. D. "Yeast Extract Agar" — T. G. PRIDHAM and colleagues — Antibiotics Annual, 1956–1957, p. 950

Ref. E. "Tomato Paste Oatmeal Agar" — T. G. PRIDHAM and colleagues — Antibiotics Annual, 1956–1957, p. 950

Ref. F. "Melanin formation medium " — The Actinomycetes, volume 2, p. 333, No. 42, S. A. WAKSMAN, The Williams and Wilkins Company, Baltimore, 1961

Ref. G. W. E. GRUNDY and colleagues — Antibiotics and Chem., 2, 401, 1952

Ref. H. "Inorganic Salts — Starch Agar" — T. G. PRIDHAM and colleagues — Antibiotics Annual, 1956–1957, p. 951

Ref. I. Formulation W-1, wherein 30 g. of sucrose are replaced by 15 g. of glucose Ref. J. Formulation W-1, wherein 30 g. of sucrose are replaced by 15 g. of glycerine Ref. K. "Synthetic medium of DIMMICK" — (no agar) — "Manual of Methods for Pure Culture Study of Bacteria" — of the Society of American Bacteriologists, Geneva, N. Y., $II_{50}$-19

Ref. L. Formulation W-18, wherein 30 g. of sucrose are replaced by 15 g. of glucose Ref. M. Formulation W-18, wherein the sucrose is removed and replaced by small strips of filter paper partially immersed in the liquid Ref. N. "Manual of Methods for Pure Culture Study of Bacteria" — of the Society of American Bacteriologists — Geneva, N. Y., $II_{50}$-18

Ref. P. "Plain gelatine" — prepared in accordance with the instructions of the "Manual of Methods for Pure Culture Study of Bacteria" — of the Society of American Bacteriologists — Geneva, N.Y., $II_{50}$-18

Ref. Q. Commercially available skimmed milk powder, reconstituted in accordance with the manufacturer's instructions.

Ref. R. Medium indicated for the research of the production of $H_2S$ by: H. D. TRESNER and F. DANGA — Journal of Bacteriology, 76, 239–244, 1958.

| Culture medium | Degree of development | Vegetative mycelium or underside of the culture | Aerial apparatus (comprising the combination of the aerial mycelium and the sporulation) | Soluble pigment | Observations and biochemical properties |
| --- | --- | --- | --- | --- | --- |
| Hickey and Tresner agar (Ref. A) | Good | V.m. thick and pleated, yellow-brown to orange-brown | Greyish-white to grey, with a few small regions possessing the black appearance characteristic of "Hygroscopicus"; exudation of a few very small pink droplets at the start of the development | Weak wine-coloured pink at the start of the culture, and then pink-brown | Sporiferous apparatus in clusters. Sporiferous filaments ending in tight spirals of 2 to 5 turns; oval spores measuring 0.4 to 0.6/0.8 to 1 $\mu$ |
| Bennett agar (Ref. B) | Good | V.m. thick and pleated, yellow-brown | Whitish to grey, with a few small regions possessing the black appearance characteristic of "Hygroscopicus" | Yellow-brown | |
| Emerson agar (Ref. C) | Good | V.m. thick and pleated, yellow-brown | Greyish-white to grey | Yellow-brown | |
| Pridham yeast extract agar (Ref. D) | Good | V.m. thick and pleated, yellow-brown | Greyish, with a few regions possessing the black appearance characteristic of "Hygroscopicus" | Yellow-brown | |
| Pridham tomato paste oatmeal agar (Ref. E) | Good | V.m. thick and pleated, yellow-brown | Light grey to dark grey, with a few small regions possessing the black appearance characteristic of "Hygroscopicus". Poorly developed | Yellow-brown | |
| Glucose/peptone agar (W-6) | Quite good | V.m. thick and pleated, chrome-yellow | None | Brown-yellow | |
| Nutrient agar (W-5) | Moderate | V.m. yellow-brown | Greyish-white. Very poorly developed | None | |
| Tyrosine/yeast extract agar for the formation of melanin (Ref. F) | Poor | Underside light yellow | Whitish. In trace amounts | Very weak yellowish | Formation of melanin: negative (readings carried out in accordance with the recommendations of the author) |
| Krainsky calcium malate agar (Ref. G) | Very poor | V.m. colourless to whitish. Very poorly developed | Whitish. In trace amounts | None | No appreciable solubilisation of the calcium malate |
| Ovalbumin agar (W-12) | Very moderate | V.m. whitish to brownish-yellow. Poorly developed | Whitish In trace amounts | Weak greyish yellow-brown | |
| Glucose/asparagin agar (W-2) | Moderate | V.m. yellow | Whitish. In trace amounts | Brown-yellow | |

—Continued

| Culture medium | Degree of development | Vegetative mycelium or underside of the culture | Aerial apparatus (comprising the combination of the aerial mycelium and the sporulation) | Soluble pigment | Observations and biochemical properties |
|---|---|---|---|---|---|
| Glycerine/ asparagin agar (W-3) | Quite good | V.m. light brownish | Whitish to greyish. Very moderately developed | Light yellow-brown | |
| Pridham starch/ inorganic salts agar (Ref. H) | Quite good | V.m. thick and pleated, yellow-brown | Greyish-white to grey, with a few small regions possessing the black appearance characteristic of "Hygroscopicus" | Very weak brownish | Sporiferous apparatus in clusters. Sporiferous filaments ending in tight spirals of 2 to 5 turns. Oval spores measuring 0.4 to 0.6/0.8 to 1 μ. Hydrolysis of the starch: positive, good |
| Starch/nitrate agar (W-10) | Moderate | V.m. yellow-brown | Whitish. In trace amounts | Greyish yellow-brown | Hydrolysis of the starch: positive but weak |
| Czapek synthetic agar containing sucrose (W-1) | Practically none | | | None | |
| Czapek synthetic agar containing glucose (Ref. I) | Good | V.m. thick and pleated, yellow-brown | Whitish to grey. In trace amounts | Yellow-brown | |
| Czapek synthetic agar containing glycerine (Ref. J) | Good | V.m. thick and pleated, yellow-brown | Whitish to light greyish. Very moderately developed | Very weak wine-coloured pink at the start of the culture, and then slightly pink yellow-brown | |
| Starch/nitrate broth (W-19) | Moderate | Yellowish-white velum | White - In trace amounts | Weak brownish-yellow | Production of nitrites from nitrates: positive but weak |
| Dimmick glucose/ nitrate broth (Ref. K) | Very moderate | Sedimented white flocculent culture | None | None | Production of nitrites from nitrates: weak, at the start of the culture |
| Czapek synthetic broth containing glucose (Ref. L) | Very moderate | Sedimented white flocculent culture | None | None | |
| Czapek synthetic broth containing cellulose (Ref. M) | None | | | | No utilisation of the cellulose |
| Nitrate nutrient broth (Ref. N) | Very moderate | White flocculent culture | None | None | Production of nitrites from nitrates: negative |
| Culture on potato (W-27) | Very good | V.m. thick and pleated, yellow-brown | Greyish-white. In trace amounts | Light yellow-brown | |
| 12% strength pure gelatine (Ref. P) | Moderate | Yellowish-grey central colony at the surface, around the inoculation point | None | None | Rapid liquefaction |
| Skimmed milk (Ref.Q) 1) at 26°C. | Average | Light brownish-yellow ring | None | | No coagulation. Rapid peptonisation. pH going from 6.2 to 6.5 in 1 month |

—Continued

| Culture medium | Degree of development | Vegetative mycelium or underside of the culture | Aerial apparatus (comprising the combination of the aerial mycelium and the sporulation) | Soluble pigment | Observations and biochemical properties |
|---|---|---|---|---|---|
| 2) at 37°C | Poor | Fragments of yellow-brown ring | None | | Coagulation followed by very slow peptonisation. pH going from 6.2 to 5.8 in 1 month |
| Tresner and Danga agar (Ref. R) | Good | Greyish yellow-brown | None | Weak yellow-brown | Production of $H_2S$: negative (readings carried out in accordance with the recommendations of the authors). |

The ability of Streptomyces hygroscopicus, strain DS 14,649 to utilise various sources of carbon and nitrogen to ensure its development was determined by the principle of the Pridham and Gottlieb method (J. Bact., 56, 107–114, 1948); the degree of development was observed, after a suitable incubation time at 26°C, on the base medium indicated by the authors, replacing either the glucose by the various sources of carbon tested, or $(NH_4)_2SO_4$ by the various sources of nitrogen tested. The results are given in the Table below:

| Sources of carbon tested | Utilisation | Sources of nitrogen tested | Utilisation |
|---|---|---|---|
| D-Ribose | positive | $NaNO_3$ | positive |
| D-Xylose | positive | $NaNO_2$ | positive |
| L-Arabinose | positive | $(NH_4)_2SO_4$ | positive |
| L-Rhamnose | negative | $(NH_4)_2HPO_4$ | positive |
| D-Glucose | positive | Adenine | positive |
| D-Galactose | positive | Adenosine | positive |
| D-Fructose | positive | Uracil | negative |
| D-Mannose | positive | Urea | positive |
| L-Sorbose | negative | L-Asparagine | positive |
| Lactose | positive | Glycine | positive |
| Maltose | positive | Sarcosine | positive but slow |
| Sucrose | negative | DL-Alanine | positive |
| Trehalose | positive | DL-Valine | positive |
| Cellobiose | negative | DL-Aspartic acid | positive |
| Raffinose | positive | L-Glutamic acid | positive |
| Dextrin | positive | L-Arginine | positive |
| Inulin | negative | L-Lysine | positive |
| Starch | positive | DL-Serine | positive |
| Glycogen | positive | DL-Threonine | positive |
| Glycerol | positive | DL-Methionine | negative |
| Erythritol | negative | Taurine | negative |
| Adonitol | negative | DL-Phenylalanine | positive |
| Dulcitol | negative | L-Tyrosine | positive |
| D-Mannitol | positive | DL-Proline | positive |
| D-Sorbitol | negative | L-Hydroxyproline | positive |
| Inositol | positive | L-Histidine | positive |
| Salicine | negative | L-Tryptophane | positive |
| | | Betaine | positive |

According to the invention enzyme 25,462 RP is prepared by culturing aerobically Streptomyces hygroscopicus DS 14,649 or a productive mutant thereof on a nutrient medium and isolating the enzyme formed during the culture.

The culture of Streptomyces hygroscopicus DS 14,649 can be carried out by any method of aerobic surface culture or submerged culture, but the latter is preferred for reasons of convenience. For this purpose, the various types of apparatus usually employed in the fermentation industry may be used.

In particular, the following sequence can be adopted for carrying out the culture:

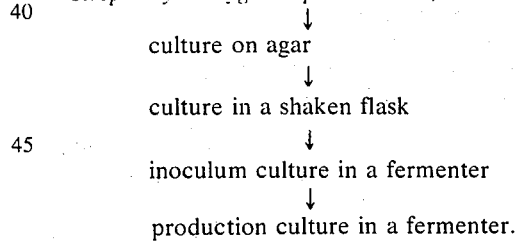

Streptomyces hygroscopicus DS 14,649 - stock
↓
culture on agar
↓
culture in a shaken flask
↓
inoculum culture in a fermenter
↓
production culture in a fermenter.

The fermentation medium must essentially contain an assimilable source of carbon and an assimilable source of nitrogen, inorganic materials and, optionally, growth factors, and these elements can be supplied as well defined products or as complex mixtures, such as are encountered in biological products of various origins.

As a source of assimilable carbon, it is possible to use carbohydrates such as glucose, maltose, dextrins, starch or other carbohydrate substances such as sugar alcohols, like glycerol or mannitol, or such as certain organic acids like lactic acid. Certain animal or vegetable oils such as lard or soya oil can advantageously replace part or all of these various carbohydrates.

Suitable sources of assimilable nitrogen are very varied. They can be simple chemical substances such as inorganic or organic ammonium salts, e.g. ammonium sulphate, or certain aminoacids. They can also be complex substances, containing nitrogen principally in a protein form, such as casein, lactalbumin, gluten and their hydrolysis products, soya flour, groundnut flour, fishmeal, peptone, meat extract, yeast extract, distiller's solubles and corn-steep.

The inorganic materials added can have (at least in part) a buffering or neutralising effect, such as that provided by the alkali or alkaline earth metal phosphates or calcium or magnesium carbonate. Other inorganic materials provide the ionic equilibrium necessary for the development of *Streptomyces hygroscopicus* DS 14,649 and the elaboration of 25,462 RP; they may be, for example, the chlorides and sulphates of the alkali or alkaline earth metals. Finally, some inorganic materials, especially cobalt salts, act as activators of the metabolic reactions of *Streptomyces hygroscopicus* DS 14,649.

The pH of the fermentation medium at the start of the culture must be between 6.0 and 7.8, and preferably between 6.5 and 7.5. The optimum temperature for the fermentation is 25°–30°C, but a satisfactory production is achieved at temperatures between 23° and 33°C. The rate of aeration of the fermentation can vary between rather wide values. However, it has been found that rates of aeration of 0.3 to 3 litres of air per litre of broth per minute are particularly suitable. The maximum yield of 25,462 RP is obtained after 3 to 7 days of culture, this time depending essentially on the medium used.

25,462 RP can be isolated from the fermentation medium in the following manner. The fermentation medium is filtered at a pH of 6.5 to 7.5, preferably at pH 7, and the filtrate is then concentrated to a volume between a quarter and an eighth of the original volume. A poor solvent for 25,462 RP, such as acetone, is added to the concentrate in the cold to precipitate the crude enzyme.

The crude enzyme can be purified by one or more of the following methods:

Fractional precipitation with inorganic salts such as ammonium sulphate or sodium chloride (added in the crystalline state or in concentrated aqueous solution) and/or with a poor solvent for 25,462 RP such as isopropanol or acetone;

dialysis across a membrane, preferably a regenerated cellulose membrane, against water, to remove substances of low molecular weight; and chromatography of an aqueous solution of 25,462 RP on a suitable adsorbent, preferably silica gel, dextran or polyacrylamide.

The following Examples illustrate the invention. The activity of the products is expressed in Kunitz units (K.U.), as defined above. This activity is expressed in K.U./cm$^3$ when a product in solution is involved, or in K.U./g. when a solid product is involved.

EXAMPLE 1

Fermentation

The following are introduced into a fermenter of 170 litres capacity:

| | |
|---|---|
| peptone | 1,200 g |
| meat extract | 600 g |
| hydrated glucose | 1,200 g |
| partially hydrolysed starch | 2,400 g |
| tap water, | to 110 litres |

The pH is adjusted to 7.30 by adding 10 N sodium hydroxide solution (120 cc.), and the medium is sterilised by bubbling steam at 122°C through it for 40 minutes. After cooling, the volume of the broth is 120 litres because of condensation of the steam during the sterilisation; the pH is 6.65. The medium is inoculated with a culture of *Streptomyces hygroscopicus* DS 14,649 (200 cc.), produced in an agitated Erlenmeyer flask. The culture is developed at 26°C for 28 hours with agitation and aeration with sterile air; it is then suitable for the inoculation of the production culture.

The production culture is carried out in a fermenter of 800 litres capacity, into which the following substances are introduced:

| | |
|---|---|
| corn-steep (50% solids) | 8 kg. |
| partially hydrolysed starch | 4 kg. |
| soya oil | 6 litres |
| calcium carbonate | 2 kg. |
| ammonium sulphate | 0.8 kg. |
| cobalt chloride hexahydrate | 8 g. |
| tap water, | to 370 litres |

The pH is adjusted to 6.40 by adding 10 N sodium hydroxide solution (570 cc.), and then the medium is sterilised by injection of steam at 122°C for 40 minutes. After cooling, the volume of the broth is 400 litres, because of condensation of the steam during the sterilisation; the pH is 6.95.

It is inoculated with the inoculum culture (40 litres) from the fermenter of 170 litres capacity described above. The culture is developed at 26°C for 88 hours, with stirring by a turbine revolving at 205 revolutions/minute and aeration with 15 cu.m./hr of sterile air. The pH of the culture medium is then 7 and its volume 410 litres. The proteolytic activity of the broth at pH7 is then 2.7 K.U./cc.

Extraction and Purification

The culture medium (200 litres), prepared as described above, but of strength 2.5 K.U./cc., is placed in a tank equipped with a stirrer. A filtration aid (10 kg.) is then added. The mixture is filtered on a filter press and the filter cake is washed with water (40 litres). A filtrate (200 litres) is thus obtained, which is concentrated to one-fifth of its volume under reduced pressure (2 mm Hg) at 30°C. The concentrate is cooled to 4°C and then dialysed through a membrane of regenerated cellulose at 4°C for 7 hours against a stream of distilled water.

Acetone (2.5 volumes), cooled to −10°C, is added slowly, with constant stirring, to the dialysed solution, kept at 4°C. The mixture is centrifuged at 2,850 G. The supernatant liquid is removed, and the precipitate is resuspended in distilled water (8 litres) at 4°C and the insoluble material is removed by centrifuging at 2,850 G. The supernatant solution has a strength of 51 K.U./cc.

Crystalline ammonium sulphate (at the rate of 561 g. per litre) is added slowly to this solution, with constant stirring. After standing for 1 hour at 4°C, the solution is centrifuged at 2,850 G and the supernatant liquid is removed. The precipitate is redissolved in distilled water (1 litre) at 4°C and the solution thus obtained is dialysed through a membrane of regenerated cellulose at 4°C for 24 hours against distilled water (40 litres). A dialysed solution (2.9 litres), of strength 55 K.U./cc., is obtained.

Isopropanol (2 volumes), cooled to −10°C, is added slowly, with constant stirring, to the dialysed solution, kept at 4°C. The mixture is centrifuged at 2,850 G; the supernatant liquid is removed; the precipitate is washed with cold isopropanol and dried under reduced pressure (20 mm Hg) at 20°C. A product (41 g.) of strength 2,250 K.U./g., is thus obtained.

EXAMPLE 2

A bread dough is prepared with the following mixture:

| | |
|---|---|
| wheat flour | 1,000 g. |
| yeast | 20 g. |
| salt | 22 g. |
| water | 640 cc. | and, in parallel, with an identical mixture to which there has been added the enzyme 25,462 RP (5 mg.), of strength 1,150 K.U./g., in the form of a "concentrate" of 0.1% by weight in the wheat flour.

After intensive kneading and a first fermentation of 60 minutes, shaping is carried out and it is found that, in the presence of the enzyme, the working of the dough is greatly facilitated: in effect, the dough can be stretched much more easily and is much less elastic then the control dough.

The preparation time (second fermentation) in the presence of the enzyme is identical to that of the control (135 minutes) and the dough obtained has a content of carbon dioxide which is identical to that of the control dough (determinations carried out on a Chopin zymotachygraph). However, the tolerance of the dough is less. If this second fermentation were extended too much, a loss of carbon dioxide would be observed.

After cooking, in the experiment with the enzyme, a loaf is obtained, the volume of which is identical to that of the control loaf, but which has a much more uniform distribution of air cells in the soft part of the bread.

EXAMPLE 3

A concentrate for industrial biscuit making, containing

| | |
|---|---|
| starch | 1,000 g. |
| enzyme 25,462 RP (of strength 1,150 K.U./g.) | 100 g. | is prepared by dry mixing. This concentrate can be added either to the dry ingredients or to the liquids, at the rate of 5 to 10 g. per load of 100 kg. of flour.

We claim:

1. A proteolytic enzyme useful for the manufacture of baked goods, produced by Streptomyces hygroscopicus DS 14649 (NRRL 3999), which is a protein very soluble in water, sparingly soluble in concentrated solutions of neutral salts and in aqueous alcoholic or aqueous-acetone mixtures, and insoluble in anhydrous alcohols and ketones, which shows a maximum proteolytic activity on casein at 25°–30°C. and at pH 6.8, and retains at least 50% of this activity between pH 5.5 and 7.0.

2. The enzyme according to claim 1 having an enzymatic activity of at least 2,250 Kunitz units per gram.

3. Process for the preparation of the enzyme of claim 1, which comprises culturing aerobically Streptomyces hygroscopicus DS 14,649 (NRRL 3,999) on a nutrient medium and isolating said enzyme formed during culturing.

4. Process according to claim 3 in which culturing is carried out at pH 6.5 to 7.5 and at 25° to 30°C.

5. Process according to claim 3 in which the culture medium is aerated with 0.3 to 3 litres of air per minute per litre of medium, 6. Process according to claim 3 in which culturing is continued for 3 to 7 days.

7. A composition comprising a flour-based dough and sufficient of a proteolytic enzyme produced by Streptomyces hygroscopicus DS 14,649 (NRRL 3,999) which is a protein very soluble in water, sparingly soluble in concentrated solutions of neutral salts and in aqueous alcoholic or aqueous-acetone mixtures, and insoluble in anhydrous alcohols and ketones, which shows a maximum proteolytic activity on casein at 25°–30°C. and at pH 6.8, and retains at least 50% of this activity between pH 5.5 and 7.0, to act as improving agent for said dough.

* * * * *